United States Patent [19]

Helfrich, Jr.

[11] 4,358,932
[45] Nov. 16, 1982

[54] CONTROL SYSTEM FOR REFRIGERATOR WITH THROUGH-THE-DOOR QUICK-CHILLING SERVICE

[75] Inventor: Robert C. Helfrich, Jr., Louisville, Ky.

[73] Assignee: General Electric Company, Louisville, Ky.

[21] Appl. No.: 298,981

[22] Filed: Sep. 3, 1981

[51] Int. Cl.³ .................... G01K 13/00; G05D 23/32; F25B 19/00
[52] U.S. Cl. ...................................... 62/126; 62/130; 62/186; 62/231; 62/419
[58] Field of Search ................ 62/126, 129, 130, 157, 62/158, 180, 186, 187, 231, 338, 377, 408, 419; 236/46 R

[56] References Cited

U.S. PATENT DOCUMENTS

| | | | |
|---|---|---|---|
| 2,656,688 | 10/1953 | Hinkel | 62/99 |
| 2,677,241 | 5/1954 | Schmock | 62/2 |
| 2,728,203 | 12/1955 | King | 62/102 |
| 3,225,564 | 12/1965 | Horvay | 62/377 |
| 3,411,312 | 11/1968 | Sigl et al. | 62/280 |
| 3,638,717 | 2/1972 | Harbour et al. | 165/30 |
| 3,659,429 | 5/1972 | McLean | 62/157 |
| 3,745,786 | 7/1973 | Laughlin et al. | 62/419 |
| 3,747,361 | 7/1973 | Harbour | 62/157 |
| 3,759,053 | 9/1973 | Swaneck, Jr. | 62/157 |
| 3,979,059 | 9/1976 | Davis et al. | 62/157 |
| 4,238,930 | 12/1980 | Hogan et al. | 62/158 |

Primary Examiner—Albert J. Makay
Assistant Examiner—Harry Tanner
Attorney, Agent, or Firm—Frederick P. Weidner; Radford M. Reams

[57] ABSTRACT

Control system in refrigerator apparatus including a freezer compartment having a quick-chilling chamber with a door for access to the interior thereof from outside the freezer compartment. There is a timer-operated fan to introduce cold air from the freezer compartment into the quick-chilling chamber and means to maintain the chamber at above-freezing temperatures after termination of fan operation. A display panel accessible to the user may be used to manually select the desired chill temperature of the item, the quantity of the item and the unit size of the item. A sensor determines the temperature of the air being introduced into the quick-chilling chamber. All of the input values are accumulated in the memory of a microcomputer and by comparing the values the microcomputer will predict when the item to be chilled will reach the desired temperature and set the timer run time accordingly. A manual switch is provided for starting the timer to run.

8 Claims, 6 Drawing Figures

CONTROL SYSTEM FOR REFRIGERATOR WITH THROUGH-THE-DOOR QUICK-CHILLING SERVICE

BACKGROUND OF THE INVENTION

The present invention is directed to a control system for a household refrigerator including a freezer compartment containing a quick-chilling chamber and having access to the chamber from outside the freezer compartment. The concept of having a chamber inside a refrigerator wherein articles may be placed for quick-chilling has been known for some time. For instance, in U.S. Pat. No. 3,659,429—McLean discloses a refrigerator in which a fast-chill space is provided in the upper portion of the refrigerator compartment and by providing an auxiliary fan in communication mainly with the refrigerator space and to a substantially lesser degree with the inlet passage from the freezer, chilled air is introduced into the fast-chill space. The auxiliary fan is energized independently of the cooling means for a time period corresponding to the time typically required to chill the particular articles undergoing chilling. The temperature of the air discharged into the fast-chill space by the auxiliary fan is, however, limited and varied depending upon whether the cooling system is operating or not. For instance, when the cooling system is not operating, the temperature of the air discharged into the fast-chill space is that of the air in the refrigerator space. Other representative prior art patents showing refrigerating apparatus with a quick-chilling feature are Schmock U.S. Pat. No. 2,677,241 and Harbour U.S. Pat. No. 3,747,361.

It is advantageous in providing for a quick-chilling compartment in refrigerating apparatus that the items to be chilled quickly are exposed immediately to below-freezing temperatures such as 0° F. to 10° F. so that they are quickly chilled and then when they reach the desired chilled temperature, they are no longer subjected to the below-freezing temperatures but are automatically maintained at a cool but above-freezing temperature. The present invention is directed to a control system for such a quick-chilling compartment and particularly a system wherein input values are accumulated in the memory of a microcomputer and by comparing the values the microcomputer will predict when the item to be chilled will reach the desired temperature and automatically provide for the quick-chilling time period.

SUMMARY OF THE INVENTION

There is provided in a refrigerator apparatus including a freezer compartment having a quick-chilling chamber for items to be quick-chilled and a timer-operated fan to introduce cold air from the freezer compartment into the quick-chilling chamber and by means to maintain the chamber at above-freezing temperatures after termination of fan operation, a control system. The control system includes a display panel on the outside of the refrigerator accessible to the user to manually select the desired chill temperature of the item, the quantity of the item and the unit size of the item. Means are provided to sense the temperature of the air being introduced from the freezer compartment into the quick-chilling chamber. In the preferred embodiment means are provided to sense the initial temperature of the item to be chilled. Memory means are provided for receiving and storing the desired chill temperature of the item, the quantity of the item to be chilled, and the unit size of the item to be chilled. Comparing means for the values received and stored in the memory means is provided to predict when the item to be chilled will reach the desired temperature and set the timer run time accordingly. There is manual select means for starting the timer to run. By this arrangement, items to be quick-chilled are automatically chilled to the desired temperature of the user and then maintained at a cool but above-freezing temperature.

BRIEF DESCRIPTION OF THE DRAWINGS

With reference to the accompanying drawings.

DESCRIPTION OF THE PREFERRED EMBODIMENT

Figure 1:
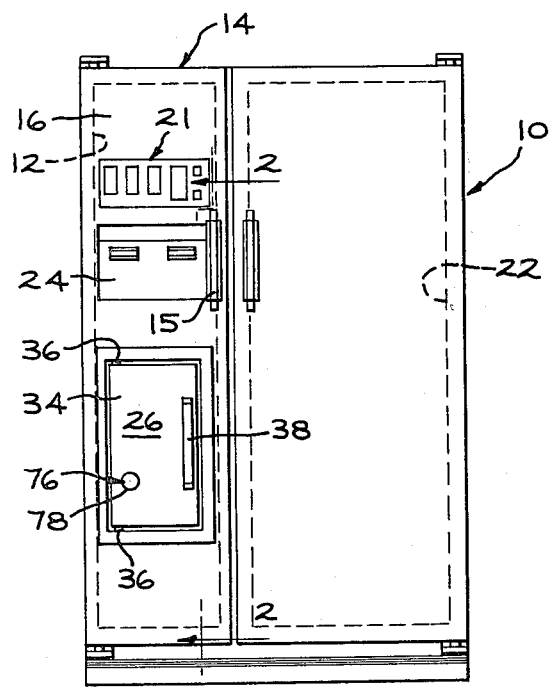
FIG. 1 is a front elevational view of a household refrigerator including the quick-chilling chamber control system of the present invention.

With reference to the accompanying drawings, there is shown, particularly in FIG. 1, a household refrigerator 10 including a freezer compartment 12 having a below-freezing temperature, usually 0° F. to 10° F., and having an access opening at the front thereof closed by a main freezer door 14 having a handle 15. The freezer door 14 has an outer wall 16 and an inner wall 18 with thermal insulation 20 therebetween and a sealing gasket 23 around the access opening. The drawings illustrate a side-by-side type of refrigerator where the freezer compartment 12 is on one side and the fresh food compartment 22 having an above-freezing temperature is on the other side and both compartments are separated by a partition 27. Both compartments are thermally insulated by suitable material 20 from the outside case 25 and also in the partition 27 between the freezer and fresh food compartments. A display panel 21 for the control system of this invention is located on the outer wall 16 of the freezer door 14 and is accessible to the user from outside the freezer compartment 12. In the drawings, there is also shown an ice through-the-door service area 24 whereby the user may obtain ice pieces without the need for opening the main freezer door 14 as described in Jacobus et al U.S. Pat. No. 3,572,053; Drieci U.S. Pat. No. 3,602,007 and Swerbinsky U.S. Pat. No. 3,621,668, all of which are assigned to the same assignee as the present invention.

Figure 4:
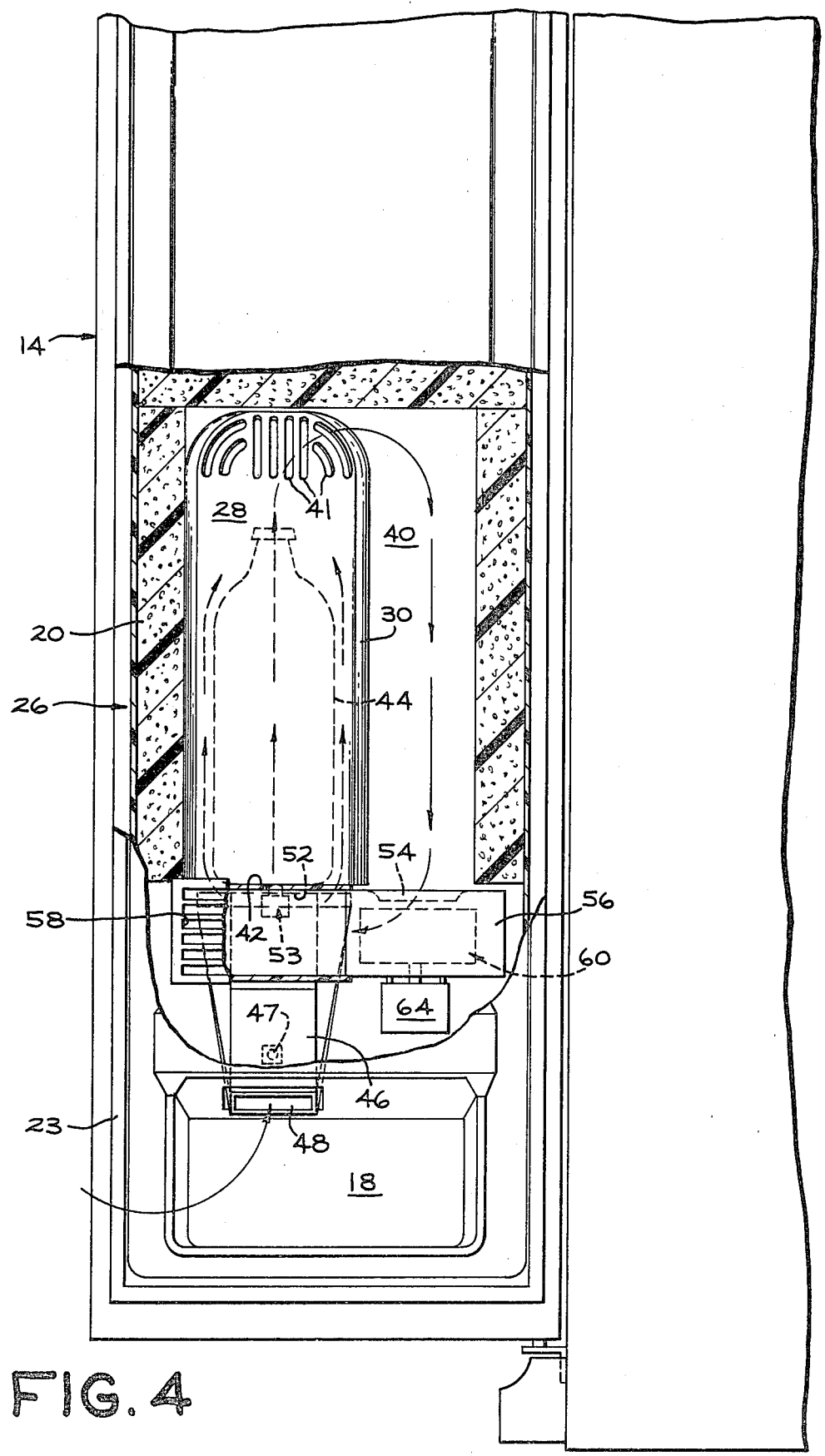
FIG. 4 is a side elevational view of a refrigerator with the fresh food compartment door removed and the freezer door open and the quick-chilling chamber shown in cross-section.
Figure 5:
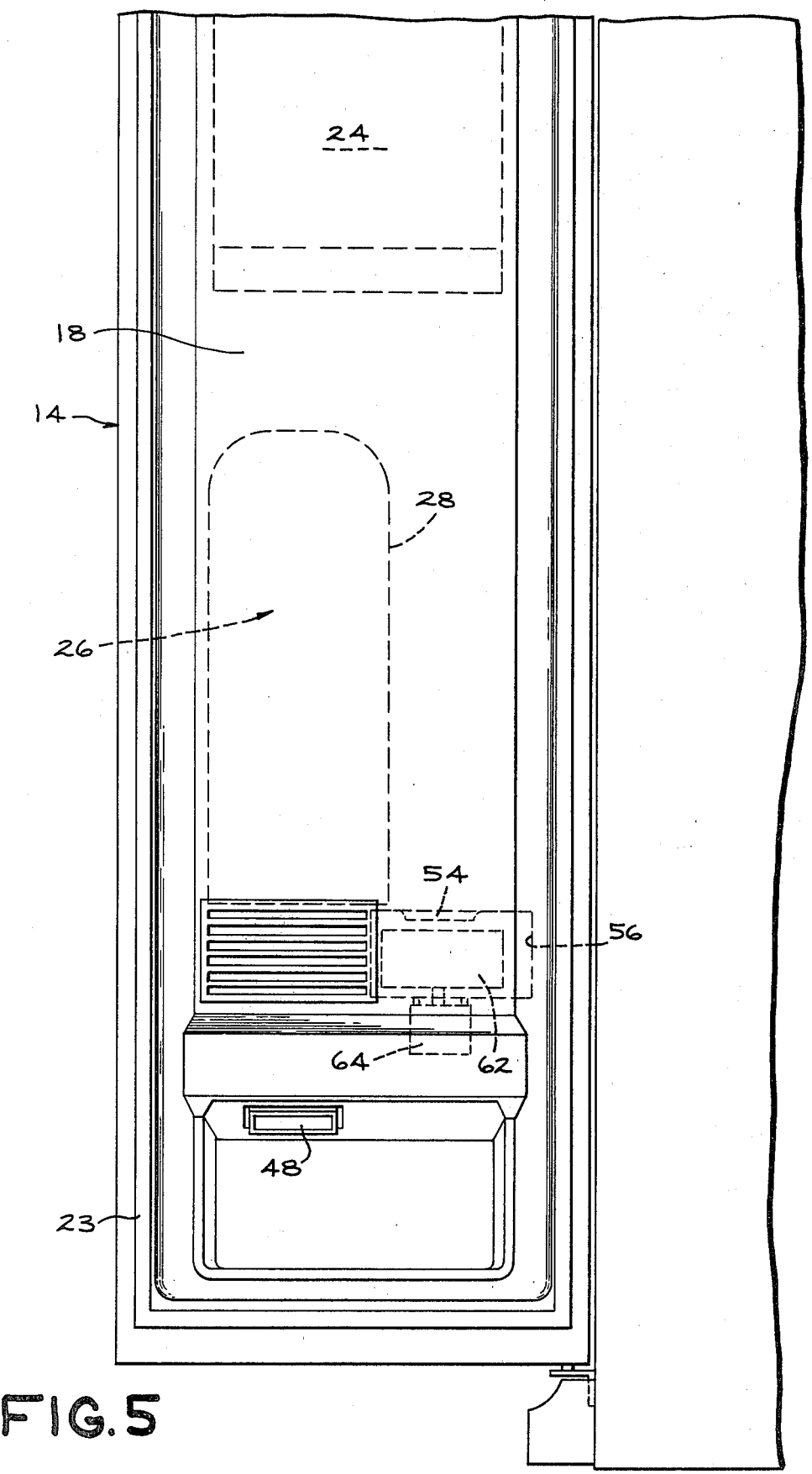
FIG. 5 is similar to FIG. 4 but without the quick-chilling chamber shown in cross section.

Located on the freezer door 14 just below the ice through-the-door service area 24 is a quick-chilling chamber 26 which is secured to or incorporated in the freezer door 14 and movable therewith. The quick-chilling chamber 26 has a first container section 28 formed by a curved side wall 30 having an access opening 32 at the front thereof. The front access opening 32 is closed by a door 34 which is secured to the outer wall 16 of the freezer door 14 as by hinges 36 at one side of the door 34 such that a person may open the door 34 by gripping a handle 38 secured to the door 34 and thus gain access to the interior of the first container section 28 for depositing and removing items that are to be quick-chilled in the chamber. Adjacent the first container section 28 is a second air-duct section 40 in the quick-chilling chamber 26 with airflow communication means between the first container section 28 and the second air-duct section 40 near the top thereof. In the embodiment shown in the drawings and particularly FIGS. 2 and 4, the airflow communication means is a plurality of slot openings 41 in the curved side wall 30 and the top wall 31 between the two sections that allow air to pass therethrough from one section of the quick-chilling chamber to the other.

Figure 3:
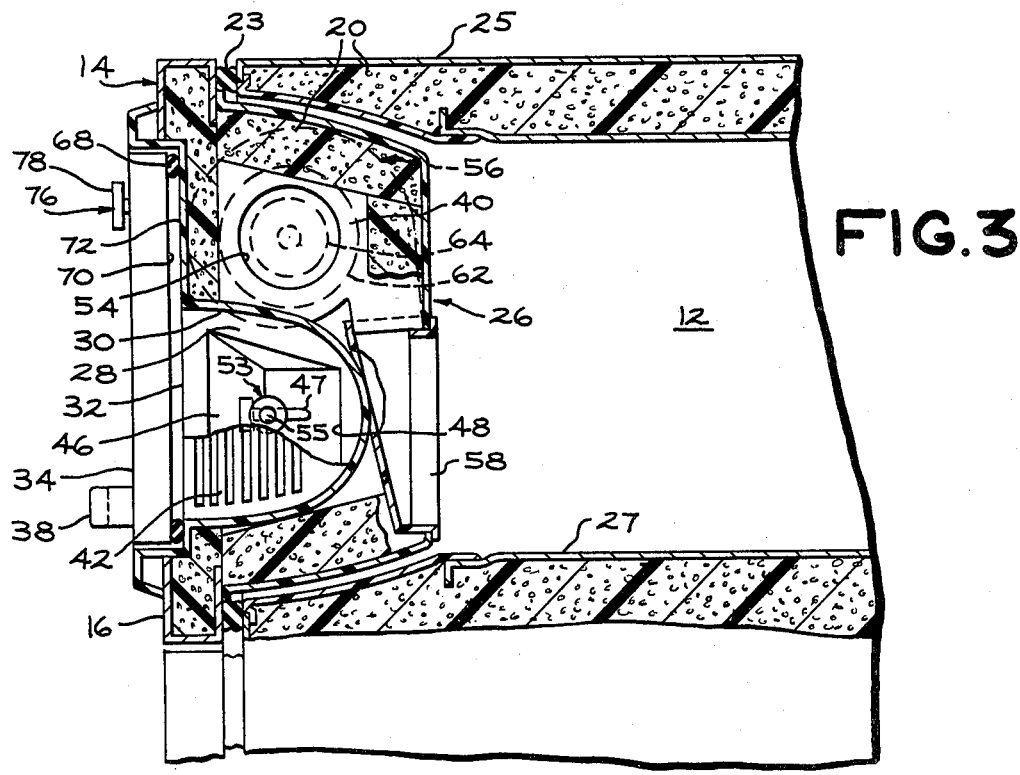
FIG. 3 is a cross-sectional view taken along the lines 3—3 of FIG. 2 showing the sensors of the quick-chilling chamber control system of the present invention incorporated into the quick-chilling chamber used in conjunction with the control system.
Figure 2:
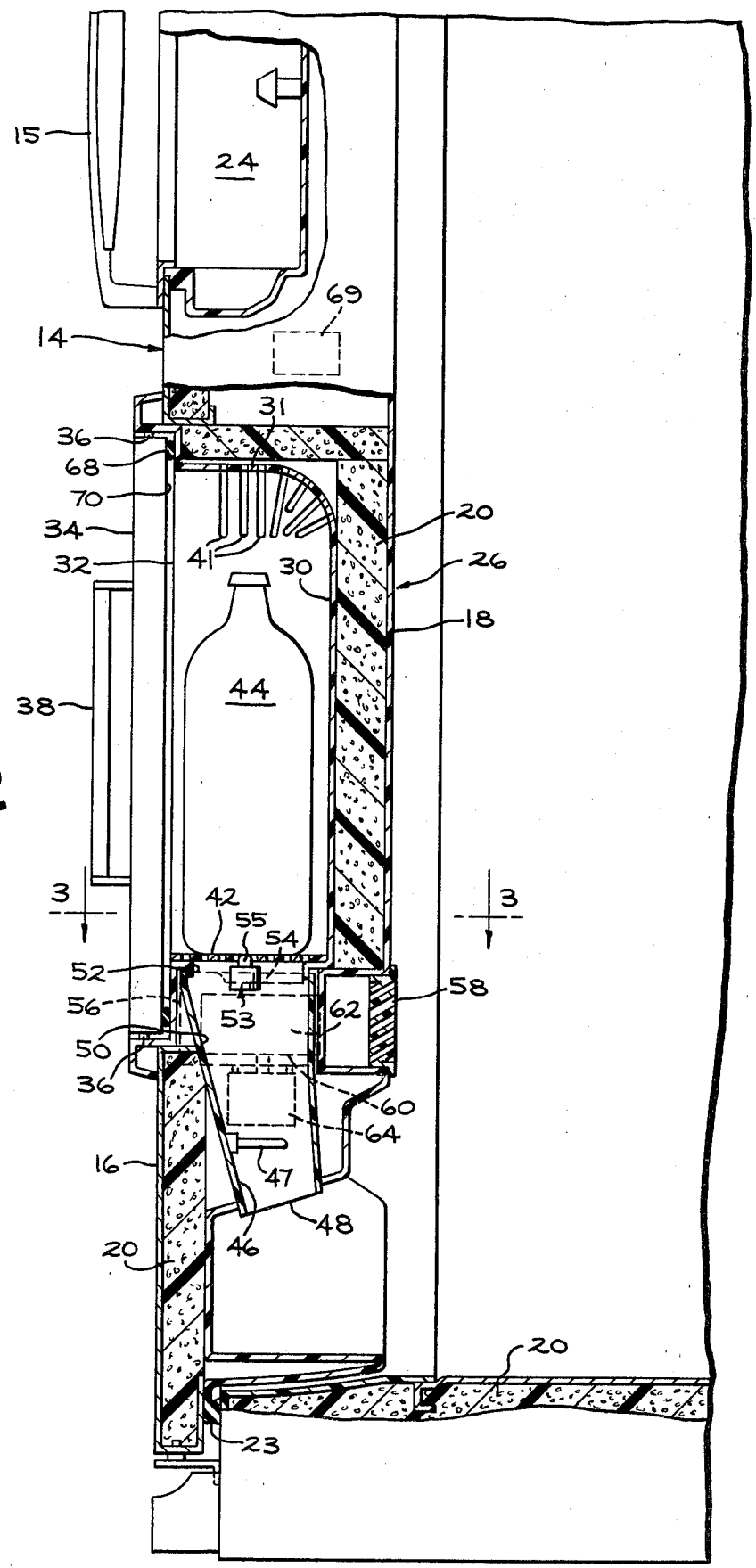
FIG. 2 is a cross-sectional view taken along lines 2—2 of FIG. 1 showing the quick-chilling chamber control system of the present invention and the quick-chilling chamber that is used in conjunction with the control system.

At the bottom of the first container section 28 is an open grid support member 42 upon which are placed items to be quickly chilled such as beverage cans, bottles, desserts, etc. and represented as element 44. Below the open grid support member 42 is an air-duct 46 with an an opening 48 which is in communication with the interior of the freezer compartment 12 when the main freezer door 14 is in its closed position as shown in FIGS. 2 and 3. Mounted on the air-duct 46 is a temperature sensor 47 that projects into the air duct cavity and is in heat transfer relationship with air passing through the air-duct 46. The upper end 50 of the air-duct 46 has an opening 52 just beneath the open grid item support member 42. With this arrangement, there is airflow communication means provided between the first container section 28 and freezer compartment 12. Mounted on the open grid item support member 42 is a temperature sensor 53 that has its temperature sensing probe 55 projecting through the grid so as to be in heat transfer relationship with items placed on the open grid item support member 42.

The second air-duct section 40 of the quick-chilling chamber 26 has an opening 54 at the bottom thereof in communication with an air duct 56 that leads from the opening 54 to an outlet opening 58 which is in communication with the interior of the freezer compartment 12 when the freezer door 14 is in its closed position as shown in FIGS. 2 and 3. By this arrangement, airflow communication means between the second air-duct section 40 and the freezer compartment 12 is provided. Located in the air-duct 56 is a means for moving air through the quick-chilling chamber 26 such as a blower unit 60 which includes a blower wheel 62 driven by an electric motor 64.

Suitable thermal insulation material 20 is located between the interior of the quick-chilling chamber 26 and the interior of the freezer compartment 12 as particularly shown in FIGS. 2 and 3. Preferably, the thermal insulation material 20 will extend at least down to the open grid support member 42. It will be noted, however, that there is no thermal insulation material between the first container section 28 and the door 34 through which access to the interior of the first container section is obtained, the purpose of which will be discussed later. There is, however, a gasket 68 that surrounds the opening 32 of the first container section 28 and does provide a seal between the interior surface 70 of the door 34 and a surrounding flanged area 72 of the opening 32 to prevent air leakage.

With the above described structural arrangement, assuming that the freezer door 14 is in its closed position as shown in FIGS. 2 and 3, energization of the electric motor 64 by suitable switching means (not shown) causes the blower wheel 62 to produce airflow which in the arrangement shown in the drawings will draw freezer air from within the freezer compartment 12 into air entrance opening 48 through duct 46 past temperature sensor 47 exiting duct 46 through opening 52 and passes through the open grid support member 42 whereupon it impinges upon the item 44 in the first container section 28 to be quickly chilled. Since the air being introduced into the first container section 28 is from the freezer compartment, it would normally be at a temperature of between 0° F. and 10° F. The air then flows through slots 1 from the first container section 28 into the top of the second air-duct section 40 of the quick-chilling chamber 26. The airflow in the second air-duct section 40 is from the top down toward the bottom where it exits the air-duct section 40 through opening 54 into the blower wheel 62. The air is pressurized by the blower wheel 62 in the usual manner and is forced through air-duct 56 to the air outlet opening 58 to the air outlet opening 58 whereupon it is expelled back into the freezer compartment 12. The airflow path through the quick-chilling chamber 26 is shown by arrows in FIG. 4. While a reverse air flow through the quick-chilling chamber 26 would be satisfactory, the air flow path shown is felt to be preferred as it introduces the coldest air possible to the item to be chilled thus requiring the minimum amount of time necessary to chill the item to the desired temperture. By this airflow system, cold freezer air is constantly in contact with the item 44 to be quickly chilled and the air is constantly being impinged upon the item 44 and removed therefrom by the airflow system thus quickly chilling the item 44. It should be noted that the inlet opening 48 and outlet opening 58 of the quick-chilling chamber 26 are positioned relative to each other so there is a minimum or no amount of the exiting air mixing with the incoming air.

One of the difficulties in quick-chilling items, particularly in freezer compartments, is that if the items are not removed from the freezing atmosphere after a sufficient period of chilling time, the item becomes frozen which is undesirable in many cases. This requires the user to keep track of the period of time the item is being quick-chilled and then removed the item from the freezing atmosphere either for immediate use or placed in the refrigerator above-freezing atmosphere. The alternative is to use above-freezing temperature to chill the item but that takes significantly more chilling time. In the quick-chilling chamber arrangement for which the control system of this invention is utilized, there is provision for quick-chilling the item 44 for a selectable period of time with below-freezing temperature air then maintain the item in an above-freezing atmosphere until the user desires to remove the item 44 from the quick-chilling chamber. To accomplish this, there is timer means associated therewith which will energize and deenergize the electric motor 64 of the blower unit 60 which, of course, initiates and stops, respectively, airflow through the quick-chilling chamber 26. The control system to automatically determine the timer run time will be discussed later. With the electric motor 64 energized, the blower 62 will operate for the period of time set thus causing the cold freezer compartment air to flow in the path previously mentioned and chill the item 44 for as long as the timer continues to run. When that period expires, the timer functions to deenergize the electric motor 64 and the blower unit 60 ceases to operate and the airflow through the quick-chilling chamber 26 is stopped. Because of the structural arrangement of the quick-chilling chamber wherein the small access door 34 is not well insulated, the interior of the first container section 28 will be affected by the outside ambient temperature and that section will have its interior elevated to slightly above freezing by thermal leakage through the small access door 34. The desired elevated temperature can be achieved by designing the structure such that the correct amount of thermal leakage is obtained. The natural phenomenon of warm air being lighter than cold air causes the warmer air within the first container section 28 to rise. The warmer air is trapped within the first container section 28 and the second air duct section 40 as it is blocked from natural convection flow into the freezer compartment 12 because access openings 48 and 50 into and out of the quick-chilling chamber 26, respectively, are located below the insulation 20 of the quick-chilling chamber 26 such that the bottom of the quick-chilling chamber is occupied by the heavier cold air in that area. Thus, with this arrangement, there is no need for movable dampers or other arrangements to prevent the interior of the quick-chill chamber 26 from being below freezing during the holding period after the quick-chilling operation. Moreover, the item 44 which was quickly chilled will be maintained at a suitable above-freezing temperature until the user desires to remove the item from the first container section 28 and access to that item is easily accomplished by merely opening the small door 34 and removing the item.

The control system for the above-described quick-chilling chamber will now be described. With the above-described quick-chilling compartment, chilling is accomplished three to five times faster than chilling identical items on the freezer shelf, and up to fifteen times faster than fresh food shelf chilling. By this invention, there is provided a control system that automatically cools the item to the final desired chilling temperature selected by the user. The control system also visually informs the user how long it will take to chill the item to the desired temperature and also automatically compensates for freezer temperature excursions occurring during chilling, and will signal the user when the item has reached the desired temperature.

For given configurations of quick-chilling compartments with known air flow velocities, measurements may be taken to determine the time required to chill items such as containers of varying sizes, shapes, initial temperatures, etc., to final desired temperatures. There are a large number of factors, including alcoholic content, sugar content, weight, container shape, and container stacking that influence the chilling time required to reach a particular desired chill temperature. There are, however, five predominant variables that when considered in the proper relationship, may be manipulated to yield a predictable and accurate chill time. These five variables are: (1) Type of container, (2) Quantity of containers, (3) Temperature of the freezer air that is flowing past the container, (4) Initial temperature of the container, and (5) Final desired temperature of the contents of the container.

The "type of container" factor defines whether a can or bottle has been selected to be chilled and the size of that selected container. The "quantity of containers" refers to the number of cans or bottles to be concurrently chilled in the quick-chilling compartment. The "freezer air temperature that is flowing past the container" will be referred to as the forced air convection or FAC temperature. The temperature will be measured by the sensor 47 located in the air duct 46. The "initial temperature of the container" is the external temperature of the container that will be measured by the sensor 53 located in the open grid item support member 42 so that it is in temperature sensing relationship with the item to be chilled which is placed on the grid support member. It will be understood that items to be chilled can conceivably have temperatures as warm as 100° F. or as cold as 40° F. depending upon where the item was stored prior to placing them in the quick-chilling chamber. The "final desired temperature of the contents within the container" may conveniently be designated as cool (55° F.), cold (45° F.), and very cold (35° F.).

It has been found that the preferred control system compares the five above-mentioned variables and if less than those five are compared, the person consuming the chilled contents of the container may be able to tell a descrepancy in the actual temperature relative to the desired temperature. A less accurate but quite acceptable control system compares only four of the above-mentioned variables by not including the value for the initial temperature of the container. If such a control system is desired, then sensor 53 would not be necessary.

The five variable algorithm can be developed to accurately predict the time required to chill a wide variety of items such as containers to various chilling temperatures. The algorithm expressed in words is as follows:

$$\text{time to chill} = \frac{\text{natural log}\left(\frac{\text{desired temp.}}{\text{initial temp.}}\right)}{\text{Constant defined by type and number of containers and } FAC \text{ Temp.}}$$

The algorithm may be written as the following equation:

$$t = \frac{\ln\left(\frac{T}{a}\right)}{b}$$

Where
  t = time required in minutes to chill the beverage to the desired temperature,
  T = desired temperature in °F.
  a = initial temperature of the container in °F.
  b = constant that is a function of container size and quantity, FAC temperature, and the compartment design.

The accuracy of the algorithm is within about 3° F. Greater than 50% of the cases applied to the algorithm are within 1° F. of the desired final temperature.

A microcomputer 69 is utilized to solve the algorithm for a given quick-chilling operation. The microcomputer 69 may comprise a self-contained integrated circuit including an arithmetic logic circuit, appropriate memory registers and input/output circuits as is well known in the art. The microcomputer 69, in part, is pre-programmed to be adapted to serve as a decision and timer means and functions as an electronic timer using either RC or digital counter timing elements.

In order to program the microcomputer, a table for the constant "b" needs to be established and that is accomplished by experimentation to determine the value for "t" and simply solve the algorithm for the unknown constant "b". It will be understood that the experimentation to determine "t" is with a given quick-chilling compartment configuration and airflow velocity. Once the values for "b" are determined, they are programmed into the microcomputer so that they may be recalled to solve the alogorithm for "t" for the control system. As an example, a portion of a table for the constant "b" that is programmed into the microcomputer would look like this:

| | | "b" Look Up Table | | | | |
|---|---|---|---|---|---|---|
| Initial Temp. (°F.) | | 75 | 75 | 100 | 100 | |
| FAC Temp. (°F.) | | 0 | 20 | 0 | 0 | |
| Number | Type Container | | | | | |
| (1) | 12 Oz. Can | −.064 | −.043 | −.065 | −.048 | |
| (3) | 12 Oz. Cans | −.042 | −.034 | −.040 | −.036 | |
| (6) | 12 Oz. Cans | −.041 | −.030 | −.036 | −.028 | "b" Values |
| (1) | 16 Oz. Bottle | −.039 | −.032 | −.053 | −.040 | |
| (1) | 1 Liter Bottle | −.033 | −.025 | −.039 | −.028 | |

The combination of the complete "b" look up table and the above equation is the quick-chilling alogrithm.

Figure 6:
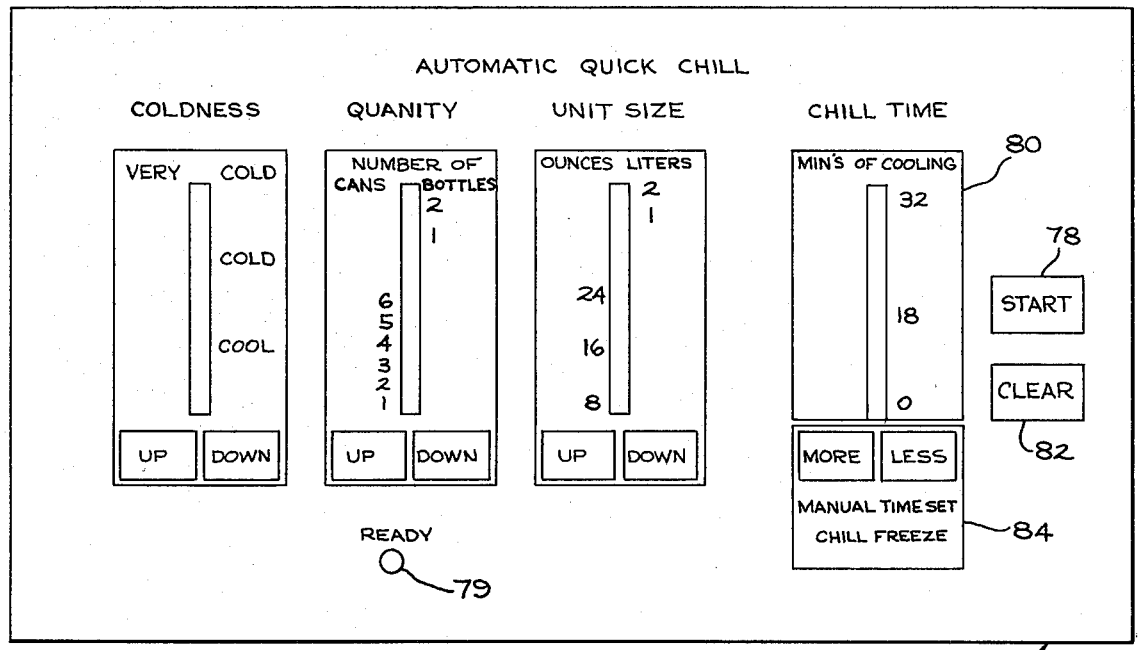
FIG. 6 is an enlarged view of the displayed panel for the control system shown in FIG. 1.

The operation of the control system of this invention will now be described particularly in connection with FIG. 6 wherein the control or display panel 21 located on the outside of the freezer door 14 accessible to the user is shown in detail. The user opens the door 34 of the quick-chilling chamber 26 and places the item or container to be chilled in the compartment and closes the door 34. On the display panel 21, the user enters the size and number of containers placed in the chamber 26 and the desired final temperature by input through an up/down slewed, membrane switch/bar graph array on the display panel. Simply by pushing the correct "up" and "down" switches, the correct value entries are registered as determined by the visual display. It will be understood that other means of inputting these three variable factors may be utilized. The values so indicated by the user are put into the microprocessor and stored for future reference. At the same time, the temperature sensor 53 senses, with its temperature sensing probe 55, the temperature of the item or container when it is placed on the open grid item support member 42 and that value is also put into and stored in the microprocessor if the five variable quick-chilling algorithm is to be used. When the user has finished entering the item information on the display panel 21, the start button 78 is actuated which energizes the blower motor 64 to operate the blower unit and introduce cold freezer air into the quick-chilling chamber 26. The temperature of the air entering the quick-chilling chamber is sensed by the temperature sensor 47 and that value is put into and stored in the microprocessor 69. With all of the value inputs now in the microprocessor, the time necessary to chill the item to the desired temperature is automatically calculated by the microprocessor solving the quick-chilling algorithm and the timer run time is automatically set. The amount of time to chill the item in the quick-chilling chilling chamber can be displayed on the chill time indicator 80 so that the user will know how long it will take for the item to be chilled to the desired temperature. Moreover, since the cold air being introduced into the quick-chilling chamber may vary in temperature during the chilling time, the temperature sensor 47 can be pulsed to take temperature measurements periodically and convey each value to the microprocessor which will, in turn, update the algorithm and thus lengthen or shorten the period of time to chill to the desired temperature depending upon the temperature of the cold air impinging on the item or container to be chilled.

When the timer run time calculated for desired chilling temperature of the item in the quick-chilling chamber has expired, the microprocessor sends an output signal to the electric motor 64 of the blower unit 60 to deenergize it. At the same time, the microprocessor can send an output signal to an audio or visual alarm 79 to tell the user that the item has reached the desired temperature. It is contemplated that the control system could also include in the display panel the adjusted remaining period of chilling time to accomplish the desired chill temperature. It is also contemplated with such a control system that should the item not be removed from the quick-chilling chamber for some time that the temperature of the item be sensed periodically and if the temperature of the item goes above the desired chill temperature set by the user, the system can automatically activate itself to provide for operation of the blower 60 for introducing cold freezer air into the quick-chilling chamber to lower the temperature of the item back down to the desired temperature. When the user wishes to terminate a particular quick-chilling operation, a termination button 82 may be actuated to clear all the input values.

In conjunction with the control system described above for automatically determining the length of time to chill an item to a desired temperature, there may also be a manual time set control 84 so that the user may enter the amount of time desired to chill an item placed in the quick-chilling chamber. It will be understood that the manual time set control would override the automatic control system.

While the preferred embodiment of the invention has been illustrated and described herein, it is realized that numerous modifications and changes will occur to those skilled in the art. It is therefore to be understood that the appended claims are intended to cover all such modifications and changes to fall within the true spirit and scope of the invention.

What is claimed is:

1. In a refrigerator apparatus including a freezer compartment having a quick-chilling chamber for items to be quick chilled and a timer-operated fan to introduce cold air from the freezer compartment into the quick-chilling chamber and means to maintain the chamber at above-freezing temperatures after termination of fan operation, a control system comprising:

(a) a display panel on the outside of the refrigerator accessible to the user to manually select the desired chill temperature of the item, the quantity of the item, and the unit size of the item, (b) means to sense the temperature of the air being introduced from the freezer compartment into the quick-chilling chamber, (c) memory means for receiving and storing the desired chill temperature of the item, (d) memory means for receiving and storing the quantity of the item to be chilled, (e) memory means for receiving and storing the unit size of the item to be chilled, (f) means comparing the values (b) through (e) to predict when the item to be chilled will reach the desired temperature and set the timer run time accordingly, and (g) manual select means for starting the timer to run.

2. The refrigerator apparatus of claim 1 wherein the display panel indicates the predicted time when the item will be chilled to the desired temperature.

3. The refrigerator apparatus of claim 1 wherein means are additionally provided to periodically sense the temperature of the air being introduced from the freezer compartment into the quick-chilling chamber during the quick-chilling period to adjust the remaining period of chilling time to accomplish the desired chill temperature.

4. The refrigerator apparatus of claim 3 wherein the display panel indicates the adjusted remaining period of chilling time to accomplish the desired chill temperature.

5. The refrigerator apparatus of claim 1 wherein means are provided to actuate an alarm to indicate when the desired chill temperature of the item is reached.

6. The refrigerator apparatus of claim 1 wherein additional means to sense the temperature of the item to be chilled is provided and that value is compared along with values (b) through (e) to predict when the item to be chilled will reach the desired temperature and set the timer run time accordingly.

7. The refrigerator apparatus of claim 6 wherein the quick-chilling chamber has a grid type shelf to support the item to be quick-chilled and the means to sense the temperature of the item to be chilled is located on the shelf in temperature sensing relationship with the bottom of the item supported on the shelf.

8. The refrigerator apparatus of claim 6 wherein means are provided to actuate an alarm to indicate when the desired chill temperature of the item is reached.

* * * * *